United States Patent [19]

Zushi

[11] Patent Number: 5,152,548

[45] Date of Patent: Oct. 6, 1992

[54] COVER FOR ACCOMMODATING AN AIR BAG

[75] Inventor: Takayasu Zushi, Shiga, Japan

[73] Assignee: Takata Corporation, Tokyo, Japan

[21] Appl. No.: 688,454

[22] Filed: Apr. 22, 1991

[30] Foreign Application Priority Data

May 24, 1990 [JP] Japan .................................. 2-134685
May 24, 1990 [JP] Japan .................................. 2-134686

[51] Int. Cl.⁵ .............................................. B60R 21/16
[52] U.S. Cl. ..................................... 280/728; 280/731; 280/732; 280/743
[58] Field of Search ................. 271/728, 731, 732, 743

[56] References Cited

U.S. PATENT DOCUMENTS 4,148,503 4/1979 Shiratori et al. ..................... 280/731
4,535,912 8/1985 Bonk ................................. 221/63 X
5,060,971 10/1991 Nanbu et al. ......................... 280/728

FOREIGN PATENT DOCUMENTS 648507 1/1951 United Kingdom .

Primary Examiner—H. Grant Skaggs
Assistant Examiner—C. Druzbick
Attorney, Agent, or Firm—Kanesaka and Takeuchi

[57] ABSTRACT

A cover for accommodating an air bag, which is provided with a tear line for starting tear at a start of an operation of the air bag, is characterized in that the tear line is provided at its end with at least either a high strength portion or a stop hole for preventing propagation of the tear.

7 Claims, 5 Drawing Sheets

FIG.IB
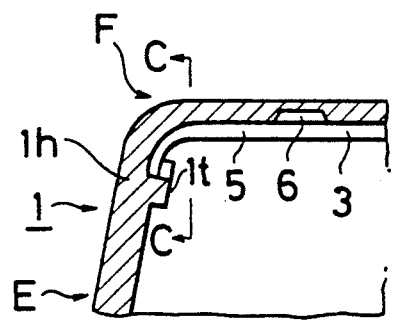
FIG.IC
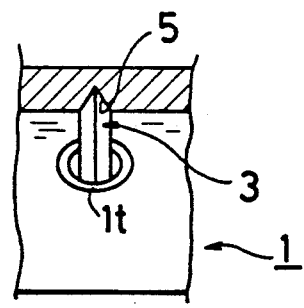

COVER FOR ACCOMMODATING AN AIR BAG

FIELD OF THE INVENTION AND RELATED ART STATEMENT

The present invention relates to a cover for accommodating an air bag which is adapted to be activated to inflate and develop by sensing an impact and/or deformation at a crash of a vehicle.

A prior art cover for accommodating an air bag is provided with a tear line at which a cover starts to tear along an intended line when the air bag is activated. This tear line is formed, for instance, of a continuous groove or intermittent grooves provided at the intended line to be torn. The groove may be provided with spaced portions having an increased depth. There has been a cover of a two-layer structure which has a hard layer and a soft layer, and is provided with a slit along the tear line in the hard layer.

In the prior art cover for accommodating the air bag, after the tear generated at the tear line in a middle portion of the cover reaches ends of the tear line, it may advance to portions other than the tear line due to an inertial force of torn pieces, and ultimately may reach the ends of the cover. If the tear spreads to the portions other than the tear line, the torn pieces may be broken and scatter, so that countermeasures for preventing the scattering are required, resulting in increase of cost.

OBJECT AND SUMMARY OF THE INVENTION

It is an object of the invention to provide a cover for accommodating an air bag in which tear in the cover during development of the air bag surely stops at ends of a tear line without further propagation, and thus scattering of the cover is surely prevented.

A cover for accommodating an air bag according to a first aspect of the invention, which is provided with a tear line for starting tear at a start of an operation of the air bag, is characterized in that the tear line is provided at its end with a portion having a high strength for preventing propagation of the tear.

A cover for accommodating an air bag according to a second aspect of the invention, which is provided with a tear line for starting tear at a start of an operation of the air bag, is characterized in that the tear line is provided at its end with a stop hole.

In the cover for accommodating the air bag of the invention, once the tear starts in the cover, the tear spreads along the tear line to the end. The tear which has reached the end of the tear line is prevented from further propagation by the portion having the high strength or the stop hole located at the end.

BRIEF DESCRIPTION OF THE DRAWINGS

FIG. 1B is a cross section taken along line B—B in FIG. 1A;

FIG. 1C is a cross section taken along line C—C in FIG. 1B;

DESCRIPTION OF THE PREFERRED EMBODIMENTS

Embodiments will be described hereinafter with reference to the drawings.

First, a first aspect of the invention will be described below with reference to FIGS. 1A–5B.

A cover 1 has a nearly oblong shape, and has a main plate portion 100 of a nearly oblong shape and four erected piece portions 110, 120, 130 and 140 erected from four sides of the main plate portion 100. The main plate portion 100 and the erected piece portions 110-140 are integrally formed of synthetic resin. This cover 1 is provided with a tear line formed as a central tear line 2 and end tear lines 3 and 4 for starting tear when an air bag is activated. The central tear line 2 extends through a central portion of the cover 1 in a lengthwise direction of the cover 1. The tear lines 3 and 4 extend in a widthwise direction of the cover 1 and are disposed near ends of the cover 1. The tear line 2 and the tear lines 3 and 4 are continuous to each other.

These tear lines 3 and 4 have ends located at middle portions of side walls of the cover 1. Protrusions 1t, i.e., portions having a high strength are arranged to form obstructions against expansion of these tear lines 3 and 4. In this illustrated embodiment, the protrusions 1t are formed of short ridges which are arranged to surround the ends of the tear lines 3 and 4.

Figure 4:
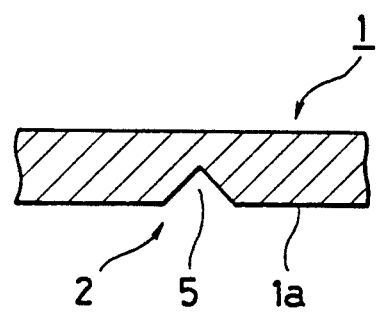
FIG. 4 is a cross section taken along line IV—IV in FIGS. 1A, 3 and 6A.
Figure 5A:
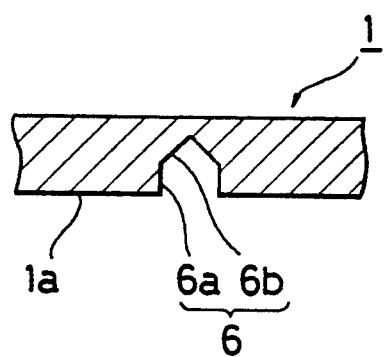
FIG. 5A is a sectional end view taken along line V—V in FIGS. 1A, 3 and 6A.
Figure 5B:
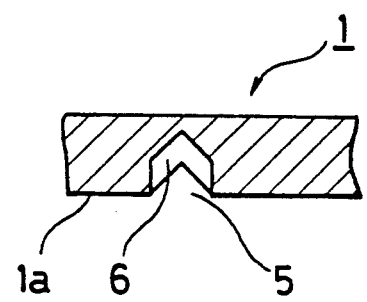
FIG. 5B is a sectional view taken along same line.

These tear lines 2, 3 and 4 include a continuous groove 5 and concave portions 6 which are formed in the groove 5 and are spaced from each other. As shown in FIG. 4, the groove 5 has a triangular section. As shown in FIG. 5, each concave portion 6 has side walls 6a perpendicular to a rear surface 1a of the cover 1 and inclined portions 6b which are formed at bottoms of these side walls 6a to form a triangular section, and thus has a pentagonal section. The concave portions 6 have hexagonal shapes in a bottom view of the cover 1, and each have two opposed apexes of the hexagon which are aligned along center lines of the tear lines 2, 3 and 4.

In a middle portion of the cover (plate), the concave portions 6 are closely disposed in the central tear line 2 with reduced spaces therebetween. These spaces between the adjacent concave portions 6 increases, i.e., the density thereof decreases as the positions move toward the tear lines 3 and 4 away from the middle portion.

In the tear lines 3 and 4, the distances between the adjacent concave portions 6 are substantially equal to each other. However, in a manner similar to the tear line 2, the distances between the adjacent concave portions 6 at the middle portions in the lengthwise direction of the tear lines 3 and 4 may be small and distances between the adjacent concave portions 6 may be increased as the positions move away from the middle portions.

The cover may be of a multi-layer structure or a single layer structure. It also may include an insert.

In the cover 1 thus constructed, when the inflating pressure of the air bag is increased, the middle portion of the cover 1 having the minimum strength starts to tear. Once the tear starts in the middle portion, this tear rapidly spreads along the tear lines 2, 3 and 4 to the ends thereof.

After the tear has spread up to the ends of the tear lines 3 and 4, the projections 1t which are provided as described above prevent the further propagation of the tear, and the tear stops at these ends of the tear lines 3 and 4. Therefore, breakage and scattering of the torn pieces due to excessive propagation of the tear can be reliably prevented.

Then, a second aspect of the invention will be described with reference to FIGS. 6A, 6B and 6C as well as FIGS. 2-5A and 5B. Structures in FIGS. 6A, 6B and 6C are the same as those in FIGS. 1A, 1B and 1C except for that the projections 1t are substituted with stop holes 1h, and thus members and parts having the same functions bear the same reference numerals.

Figure 6A:
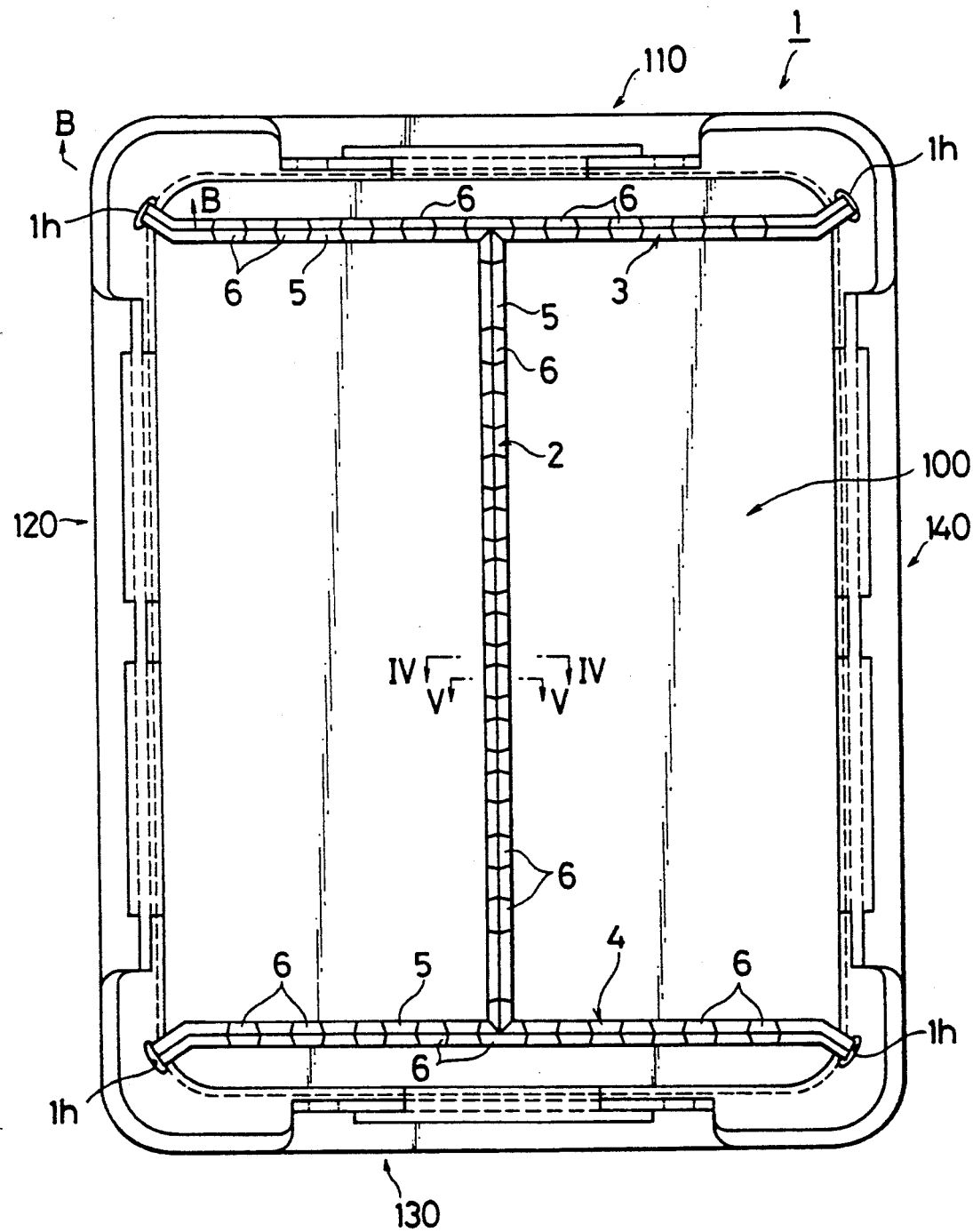
FIG. 6A is a bottom view of a cover for accommodating an air bag according to a second aspect of the invention.
Figure 6B:
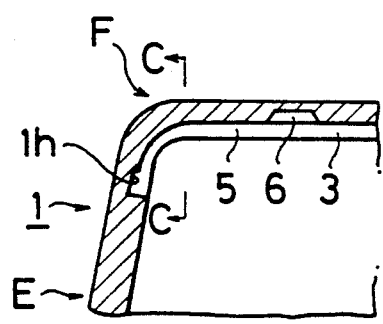
FIG. 6B is a cross section taken along line B—B in FIG. 6A.
Figure 6C:
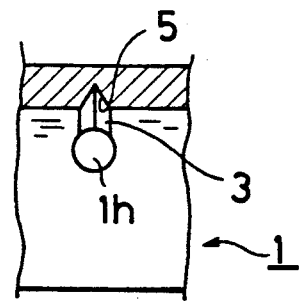
FIG. 6C is a cross section taken along line C—C in FIG. 6B.

In the structures shown in FIGS. 6A, 6B and 6C, the tear lines 3 and 4 have ends located at the middle portions of the side walls of the cover 1. Stop holes 1h are arranged to form obstructions against expansion of these tear lines 3 and 4. In this illustrated embodiment, the stop holes 1h are formed of concave portions on the inner surface of the cover 1 having round shapes (e.g., circular or oval shape). Through holes are not employed so as to prevent ingress of a dust and others into the cover 1.

In the cover 1 thus constructed, when the inflating pressure of the air bag is increased, the middle portion of the cover 1 having the minimum strength starts to tear. Once the tear starts in the middle portion, this tear rapidly spreads along the tear lines 2, 3 and 4 to the ends thereof.

After the tear has spread up to the ends of the tear lines 3 and 4, the stop holes 1h which are provided as described above prevent the further propagation of the tear, and the tear stops at these ends of the tear lines 3 and 4. Therefore, breakage and scattering of the torn pieces due to excessive propagation of the tear can be reliably prevented.

In the illustrated embodiment, the apexes of the concave portions 6 are located on a center line of the groove 5, and thus the tear generated in the concave portions 6 is rapidly transmitted to portions of the groove 5 other than the concave portions 6. Since the groove 5 has the minimum thickness at its center line portion, the tear rapidly spreads along the center line of the groove 5.

Figure 1A:
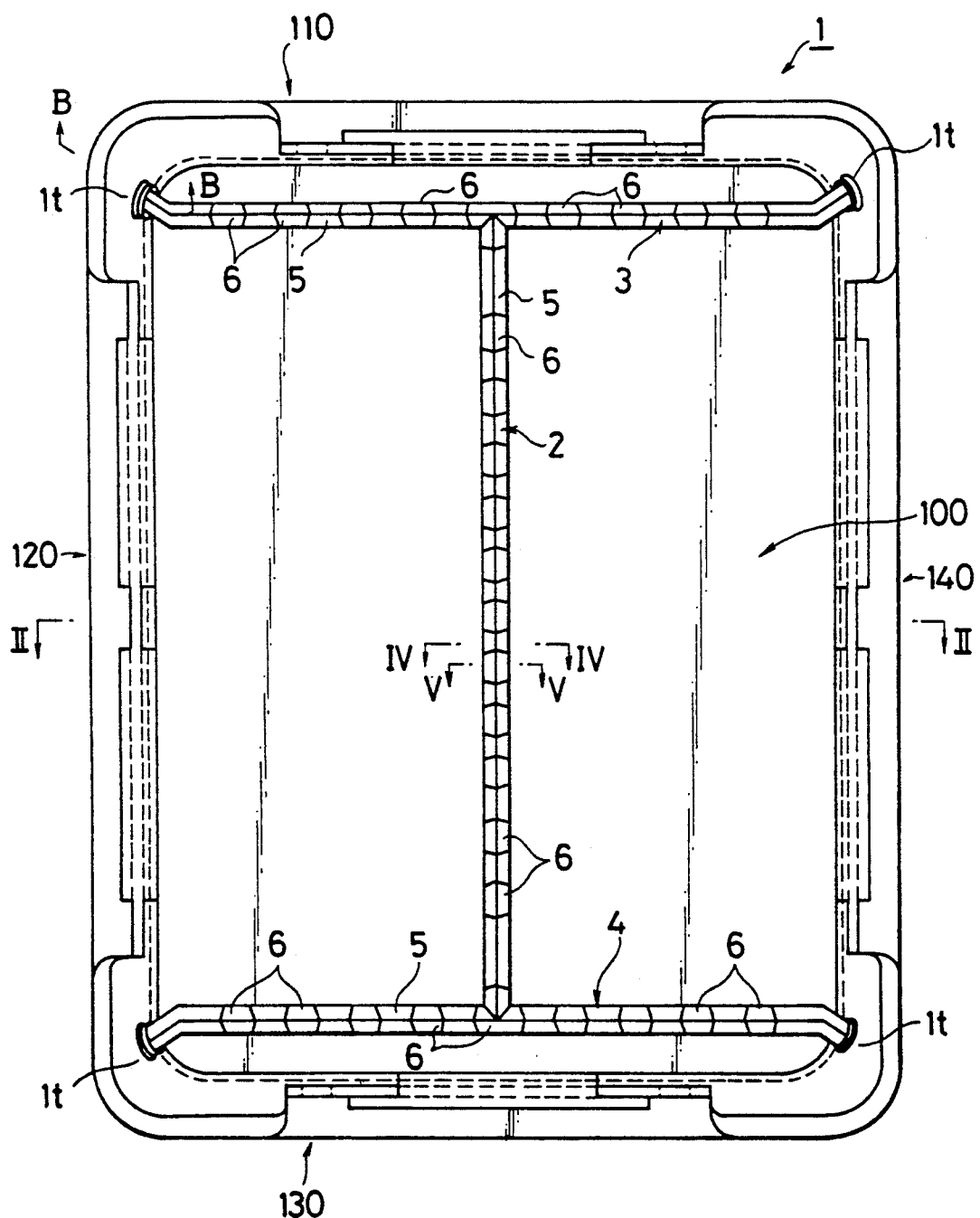
FIG. 1A is a bottom view of a cover for accommodating an air bag according to a first aspect of the invention.
Figure 2:
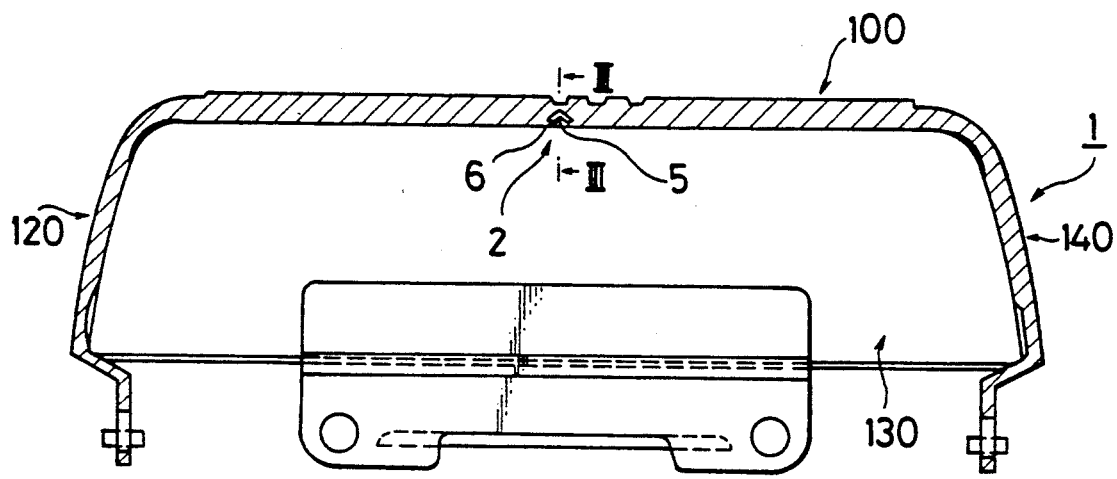
FIG. 2 is a cross section taken along line II—II in FIGS. 1A and 6A.
Figure 3:
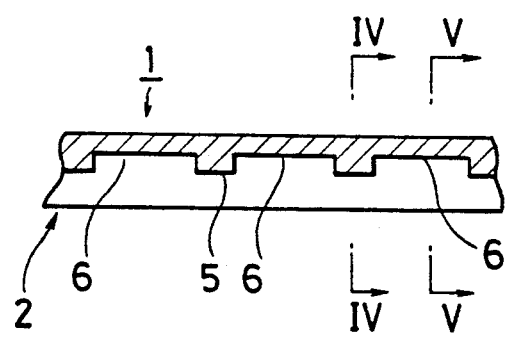
FIG. 3 is a cross section taken along line III—III in FIG. 2.

In the embodiment shown in FIGS. 1A, 1B and 1C, the portions having high strength are formed by the projections 1t. However, in the invention, a member or members, which have a higher strength than the cover material, such as metal meshes, metal plates or high strength synthetic resin may be embedded (e.g., inserted) in the end portions of the tear lines so as to prevent further propagation of the tear.

In the embodiment shown in FIGS. 6A, 6B and 6C, only the stop holes 1h are employed so as to prevent the further propagation of the tear. However, in the invention, a member or members, which have a higher strength than the cover material, such as metal meshes, metal plates or high strength synthetic resin may be embedded (e.g., inserted) in the portions around the stop holes 1h except for the tear lines so as to prevent further propagation of the tear.

In the cover for accommodating the air bag which has a two-layer structure formed of an inner hard layer and an outer soft layer, it is effective to provide the stop holes which penetrate only the hard layer.

Layouts and sectional shapes of the tear lines are illustrated in Figures only as an example of the invention, and naturally, the tear lines may have other layouts and sectional shapes.

The end portions of the tear lines may be located at positions other than the illustrated positions. For example, they may be located at portions E near the edges of the cover 1 shown in FIGS. 1B or at a top wall F shown in FIG. 6B, and the high strength portions or stop holes for preventing the propagation of the tear may be associated thereto.

According to the cover for accommodating the air bag of the invention, as also apparent from the embodiments described hereinabove, the tear during the development of the air bag is reliably stopped at the ends of the tear lines and is prevented from further propagation. Therefore, scattering of the cover can be reliably prevented. Further, the strength required in the cover is reduced and a mechanism for preventing scattering of the cover is not required. Therefore, simplification of the structures and reduction of costs can be achieved.

What is claimed is:

1. A cover for accommodating and covering an air bag in an air bag device, comprising:

a main plate portion having side portions and an inner surface, erected piece portions extending from the side portions of the main plate portion and having inner surfaces, a tear line formed at the inner surfaces of the main plate portion and the erected piece portions, said tear line extending across the main plate portion and parts of the erected piece portions and having ends at the erected piece portions, and tear stop means formed in the erected piece portions at the ends of the tear line for stopping tear of the cover when the cover is opened upon inflation of the air bag, said tear stop means being formed of a high strength portion surrounding the end of the tear line except a portion of the tear line, said high strength portion extending outwardly from the inner surface of the erected piece to have a thickness greater than a thickness of the erected piece so that when the cover of the air bag is torn along the tear line upon inflation of the air bag, tear of the cover is surely prevented at the tear stop means.

2. A cover of claim 1, wherein said tear line includes a central tear line, which extends in a lengthwise direction of said main plate portion at a middle portion of said main plate portion from one end of said main plate portion to the other end thereof, and end tear lines which are continuous to said central tear line and are extended in a widthwise direction of said main plate portion at opposite end portions of said main plate portion and further across said erected piece portions up to said middle portions of said erected piece portions.

3. A cover of claim 1, wherein said high strength portion is formed by inserting a high strength member having a higher strength than cover material into said cover.

4. A cover of claim 1, wherein said tear line includes a groove extending inwardly from the inner surface of the main plate portion and the erected piece portions to facilitate tear of the cover.

5. A cover for accommodating and covering an air bag in an air bag device, comprising:
- a main plate portion having side portions and an inner surface,
- erected piece portions extending from the side portions of the main plate portion and having inner surfaces,
- a tear line formed at the inner surfaces of the main plate portion and the erected piece portions, said tear line having a central tear line with end portions, said central tear line extending substantially across the main plate portion at a middle of the main plate portion, and end tear lines continuously extending in the main plate portion from the end portions of the central tear line substantially perpendicularly to the central tear line, said end tear lines further extending into the erected piece portions and having ends therein, and
- tear stop means formed in the erected piece portions at the ends of the end tear lines for stopping tear of the cover when the cover is opened upon inflation of the air bag, each tear stop means being formed of a concave portion extending inwardly from the tear line to have a thickness less than a thickness of the tear line so that when the cover of the air bag is torn along the tear line upon inflation of the air bag, tear of the cover is surely prevented at the tear stop means.

6. A cover of claim 5, wherein said concave portion has a substantially round shape on said inner surface of said cover.

7. A cover of claim 5, wherein said tear line includes a groove extending inwardly from the inner surface of the main plate portion and the erected piece portions, said concave portion further inwardly extending from the groove and having a side wall so that a thickness of an area around the side wall is greater than a thickness at the groove to thereby surely prevent tear of the cover at the groove.

* * * * *